United States Patent [19]

Rabipour et al.

[11] Patent Number: 4,853,958
[45] Date of Patent: Aug. 1, 1989

[54] LPC-BASED DTMF RECEIVER FOR SECONDARY SIGNALLING

[75] Inventors: Rafi Rabipour; Michael G. Beyrouti, both of Verdun; Paul Mermelstein, Montreal, all of Canada

[73] Assignee: Northern Telecom Limited, Montreal, Canada

[21] Appl. No.: 201,154

[22] Filed: Jun. 2, 1988

[51] Int. Cl.⁴ .......................... H04J 3/12; H04M 3/22
[52] U.S. Cl. .................................... 379/386; 364/484; 364/728.03; 370/110.3; 379/283
[58] Field of Search ............................... 379/283, 386; 370/110.3; 364/484, 728.03, 728.05; 328/140, 141

[56] References Cited

U.S. PATENT DOCUMENTS 4,211,897 7/1980 Ichikawa et al. ............... 379/283 X
4,614,909 9/1986 Jarvfalt ............................. 328/140

Primary Examiner—Thomas W. Brown
Attorney, Agent, or Firm—John E. Mowle

[57] ABSTRACT

A dual tone multi-frequency (DTMF) receiver for use in detecting digitally transmitted signals in the telephone industry. The receiver derives linear predictive coefficients for the digital signals in the data frame. This information is used to compute frequency response magnitudes at the DTMF frequencies. A plurality of magnitude comparisons are then performed to verify the presence of true DTMF signals and concurrently the frequency of these signals is obtained.

9 Claims, 4 Drawing Sheets

LPC-BASED DTMF RECEIVER FOR SECONDARY SIGNALLING

BACKGROUND OF THE INVENTION

This invention relates to dual tone multi-frequency (DTMF) receivers.

DTMF receivers are used in the telephone industry, for example in central offices, to detect the presence of pairs of tones at predetermined frequencies. In North America, each pair, to be valid, must comprise one tone from a so-called "low" group of frequencies—697 Hz, 770 Hz, 852 Hz and 941 Hz. The other tone must be from a so-called "high" group—1209 Hz, 1336 Hz, 1477 Hz and, optionally, 1633 Hz.

Hitherto, DTMF receivers have detected such tone pairs by means of a bank of bandpass filters to estimate the energies of narrow bands of the spectrum to obtain a representation of the signal system. A DTMF signal (tone pair) is registered as present if, and only if, the outputs of the bandpass filter bank indicate a sufficicient level of energy in only two valid spectral bands, subject to other criteria generally accepted in the industry. Once the presence of the tone pair has been determined in this way, it merely remains to identify the particular frequencies concerned.

This technique could be used with either analogue or digital bandpass filters. To implement a suitably sharp bandpass filter digitally, however, would require a high filter order and consequentially large computational power. Nevertheless, it is preferable to use digital techniques, especially if it is desired to use a DTMF receiver for secondary signalling, for example in a voice messaging system.

As an alternative to bandpass filters, the shape of the signal spectrum can be determined directly by computing, for example, the correlation of the signal with tones at frequencies of interest. To be reliable, however, the correlation must be computed on long blocks of signal samples, usually referred to as data frames. Furthermore, the correlation must be computed at a large number of frequencies to give a meaningful representation of the signal spectrum. This results in high computational complexity. Such complexity could be tolerated in the past, when DTMF receivers were used only for primary signalling—typically located at a central office and accessed only when a user dialled a destination number.

As mentioned previously, DTMF tones may now be applied to secondary signalling, enabling the user to access services such as voice messaging. It is desirable, therefore, to use DTMF receivers at a local level, for example in, or accesible from, a PBX (private branch exchange). Generally, then, DTMF receivers will be more widespread than hitherto and there is a concomitant requirement for them to be simpler and cheaper.

It has been proposed to reduce the number of computations by applying a modelling technique to the data frame. More specifically, it has been proposed to use Linear Predictive Coding (LPC) to convert the data frame to a set of parameters, i.e. poles, which comprise a model for the signal over the time period of the data frame. Thus, a data frame of 128 samples might be modelled by only 14 LPC poles, or fewer.

The use of LPC in this way is disclosed by B.I. Pawate, W. Steenaart and B. Sankur in a paper entitled "The DTMF Receiver Based on Linear Prediction", Proc. of the Twelfth Biennial Symposium on Communications, Queen's University, Kingston, June 4-6, 1984.

In theory, since the linear predictive coding provides a model of the signal spectrum, the DTMF tones could be detected by applying filtering to the LPC model, computing frequency response magnitudes at the eight different frequencies specified for DTMF signals, and comparing them with thresholds.

In practice, such a simple algorithm does not necessarily indicate the presence of a DTMF tone pair with the reliability and accuracy required within the telephone system.

SUMMARY OF THE INVENTION

According to one aspect of the present invention, a dual tone multi-frequency (DTMF) receiver for detecting a DTMF signal comprising two tones, one from a specified group of low frequencies and the other from a specified group of high frequencies, comprises:

(i) means for monitoring a data signal in data frames of a predetermined length;

(ii) means for deriving for each data frame a set of linear prediction coefficients (LPC) modelling the spectrum of the signal during that data frame;

(iii) means for computing the frequency response magnitudes (FRM) at the prescribed DTMF frequencies using the linear prediction filter coefficients for a particular data frame;

(iv) means for determining from such frequency response magnitudes the smallest magnitude corresponding to the low frequency group and the smallest magnitude corresponding to the high frequency group;

(v) means for determining, in each group, magnitudes different from the smallest; and (vi) means for comparing said smallest magnitude in each group and said different magnitude in each group with respective thresholds and, in dependence upon such comparison, registering the signal in said data frame as a DTMF signal.

According to a second aspect of the invention, there is provided a method of detecting the presence of dual tone multifrequency (DTMF) signals, each comprising one of a specified group of low frequencies and one of a group of specified high frequencies, comprising the steps of:

(i) storing frames of a digital signal successively;

(ii) performing a linear prediction coefficient (LPC) analysis upon an instant frame (i) to produce an all-pole model of the spectrum of said digital signal for such instant frame;

(iii) computing LPC analysis filter coefficients corresponding to said all-pole model;

(iv) computing for each of said group of low frequencies and said group of high frequencies a set of frequency response magnitudes (FRM), each corresponding to one of the DTMF frequencies;

(v) determining which of said set of frequency response magnitudes corresponding to the group of low frequencies has the smallest magnitude (a0) and identifying the low group frequency ($f_L$) to which such smallest low-group magnitude corresponds;

(vi) determining which of said set of frequency response magnitudes corresponding to the group of high frequencies has the smallest magnitude (b0) and identifying the high-group frequency ($f_H$) to which such smallest high-group magnitude corresponds;

(vii) computing for said low-group frequency ($f_L$) four frequency-deviated frequency response magnitudes, a first FRM (a+δ) corresponding to a neighboring higher frequency (1.015f$_L$), a second FRM (a+Δ) corresponding to a more distant higher frequency (1.035f$_L$), a third FRM (a−δ) corresponding to a neighboring lower frequency (0.985f$_L$) and a fourth FRM (a−Δ) corresponding to a more distant lower frequency (0.965f$_L$);

(viii) computing for said high-group frequency (f$_H$) four frequency-deviated high-group frequency response magnitudes, a first FRM (b+δ) corresponding to a neighboring higher frequency (1.015f$_H$), a second FRM (b+Δ) corresponding to a more distant higher frequency (1.035f$_H$), a third FRM (b−δ) corresponding to a neighboring lower frequency (0.985f$_H$) and a fourth FRM (b−Δ) corresponding to a more distant lower frequency (0.965f$_H$);

(ix) comparing the smallest frequency response magnitude FRM (a0) of said set of FRMs corresponding to the low group of frequencies, said first FRM (a+δ) corresponding to the neighboring higher frequency and said third FRM (a−δ) corresponding to said neighboring lower frequency, and determining (a) which is the smaller low-group FRM magnitude;

(x) comparing said smaller low-group FRM (a) with said second FRM (a+Δ) and said fourth FRM (a−Δ), corresponding to said more distant higher frequency and said more distant lower frequency, respectively, and, if the magnitude of either said second FRM or said fourth FRM is smaller than said smaller low-group FRM magnitude, indicating that the instant frame of the input signal is not DTMF;

(xi) comparing the smallest frequency response magnitude (b0) of said set of FRMs corresponding to the high group of frequencies with said first (b+δ) and said third (b−δ) high-group FRMs corresponding to neighboring higher and lower frequencies, respectively, and determining (b) which is the smaller high-group frequency response magnitude; and (xii) comparing said smaller high-group frequency response magnitude (b) with said second FRM (b+Δ) and said fourth FRM (b−Δ), corresponding to said more distant higher frequency and said more distant lower frequency, respectively, and, if the magnitude of either said second FRM or said fourth FRM is smaller than said smaller high-group frequency response magnitude, indicating that the instant frame of the input signal is not DTMF.

Thus, the different magnitudes are computed at two frequencies which deviate from the DTMF frequencies by predetermined different margins, in this example ±1.5 per cent and ±3.5 per cent. Such different magnitudes are each compared with the associated one of the DTMF frequencies. Should the magnitude at the closer different frequency be smaller, its value is substituted (i.e. a=min(a0,a±δ) or b=min(b0,b±δ)) for the first magnitude. Should the magnitude of (a) or (b) at the further different frequency then be the smaller (i.e. a≧a±Δ, or b≧b±Δ), the signal is determined not to be a DTMF signal.

In the event that the magnitudes at the greater deviation are not the smallest, the original magnitudes (updated or not) are compared with respective thresholds. If the lesser of the two magnitudes (V$_L$) in a low/high frequency pair (a,b) is greater than a threshold (T1), the signal is deemed not to be DTMF. If the larger of the two magnitudes (V$_H$) in the pair (a,b) is greater than a threshold (T2), the signal is deemed not to be DTMF.

In preferred embodiments, the threshold T1 is dependent upon the instant signal energy E$_i$. For example, the threshold T1 may be determined in accordance with the expression:

if $E_i \leq E_o$: $T1 = T1_0 \times (1.39 \log_2 (E_o/E_i))$ else: $T1 = T1_0$ where:
E$_i$ is the instant signal energy;
E$_o$ is a fixed threshold; and
T1$_0$ is a constant.

If the ratio of the larger magnitude (V$_H$) to the lesser magnitude (V$_L$) is greater than a threshold (T3$_1$), and V$_L$ is greater than a predetermined amount (T3$_0$), the signal is deemed not to be DTMF. On the other hand, if the lesser magnitude (V$_L$) is less than such predetermined amount T3$_0$, and the larger magnitude (V$_H$) is greater than another threshold (T3$_2$), the signal is deemed not to be DTMF.

In yet another embodiment of the invention, the different magnitudes comprise the next-smallest magnitudes (a1,b1) in each group. The receiver includes means for comparing the ratio of the smallest and second-smallest magnitudes (a,a1) of the low frequency group with a threshold (T4) and registering the signal as not being DTMF if such ratio (a/a1) is greater than such threshold (T4). The receiver includes means for comparing the ratio of the smallest and second smallest magnitudes (b,b1) of the high frequency group with a threshold (T5) and registering the signal as not DTMF if such ratio is greater than such threshold (T5).

In a further embodiment of the invention, the magnitudes (c and d) at out of band frequencies for each of the high and low groups respectively are also determined; each lower than the lowest DTMF frequency specified in the corresponding group. The receiver then includes means for determining whether the ratio of the magnitude (c) to the smallest magnitude (b) in the high group is larger than a threshold T6 and registering the absence of a DTMF signal if it is not. The receiver also includes means for determining whether the ratio of the magnitude (d) to the smallest magnitude (a) in the low is greater than a threshold T7 and registering the absence of a DTMF signal if it is not. In preferred embodiments, thresholds T6 and T7 are constants. They may, however, be dependent upon frequencies f$_H$ and f$_L$, respectively.

Finally, in the aforesaid further embodiment, the magnitudes may be subjected to an energy test.

The embodiments described above may be used independently in a DTMF receiver. It is advantageous, however, to combine them logically.

BRIEF DESCRIPTION OF THE DRAWINGS

An embodiment of the invention will now be described by way of example only, with reference to the accompanying drawings, in which.

DESCRIPTION OF THE PREFERRED EMBODIMENT

Figure 1:
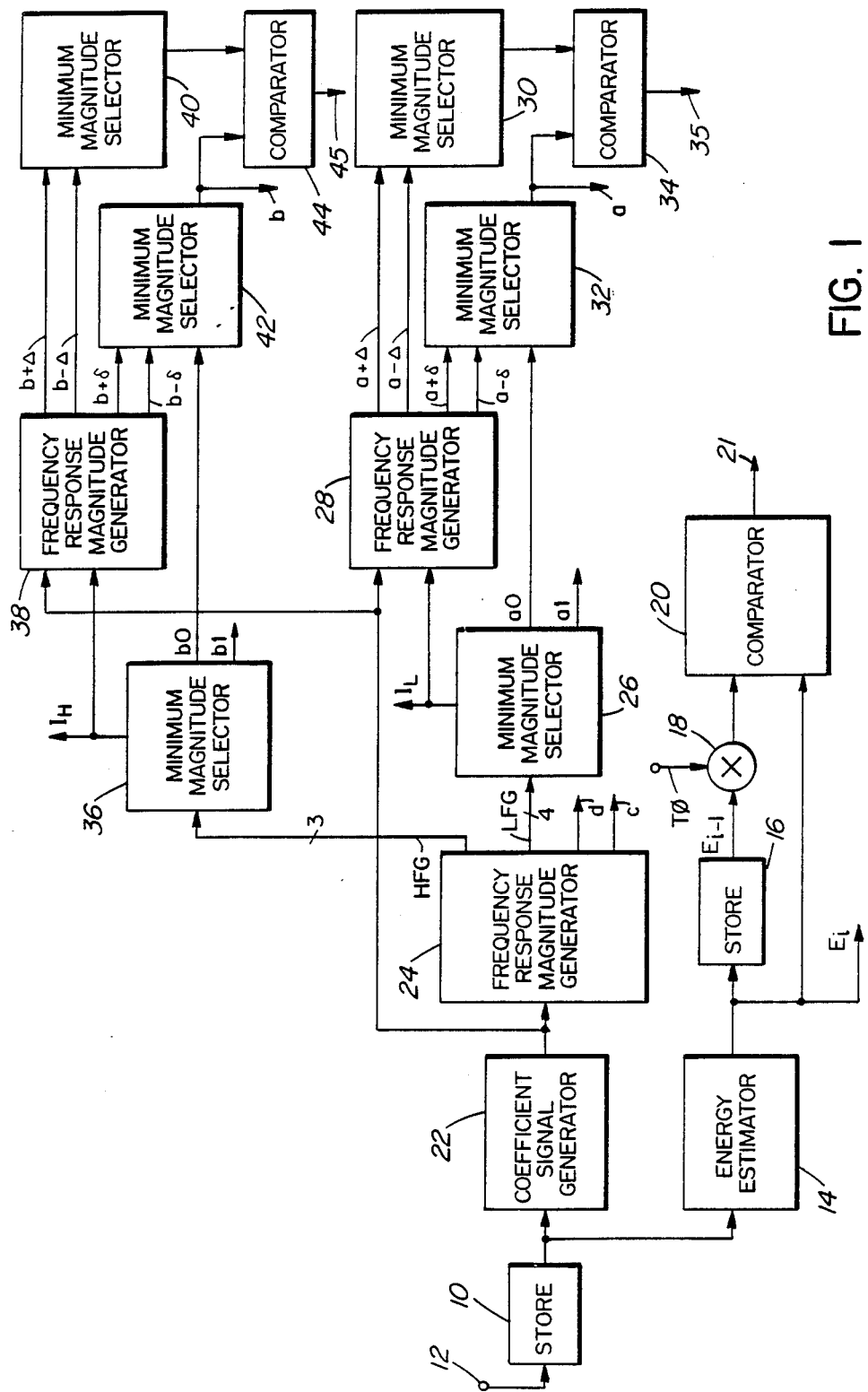
FIG. 1 is a block schematic diagram of an input stage of an LPC-based DTMF receiver.

Referring now to FIG. 1, a DTMF receiver for use in, for example, a central office switch has a store 10, which stores, in blocks of 224, samples of a PCM (pulse code modulated) input signal received on line 12. The input signal is band-limited to about 3.5 KHZ and quantized with an 8-bit μ-law quantizer at a sampling rate of 8 KHz.

A first test for DTMF tones is an energy test. Energy estimator 14 serves to compute on estimate $E_i$ of the energy of the instant block of data samples stored in store 10 and supply it to a second store 16 as the "previous" block's energy $E_{i-1}$. Multiplier 18, which receives the output of second store 16 and a reference threshold T0, is connected to one input of a comparator 20. The other input of comparator 20 is connected to the output of energy estimator 14. The output 21 of comparator 20 is applied to one input of an AND gate 88—see FIG. 3. Multiplier 18 and comparator 20 serve to determine whether $(E_i/E_{i-1}) \leq T0$. Hence, the output of the comparator 20 is low if the ratio of the instant block's energy to the energy of the previous block is less than T0, in which case the input signal is deemed not to be a pair of DTMF tones. T0 is determined according to the block length and has a value of 0.35. This test serves to detect "off" times as short as 40 msec. in the presence of signal echo.

Further tests are performed on the LPC coefficients of the block of samples in store 10. Thus, coefficient signal generator 22 has its input connected to sample store 10 and computes the LPC analysis filter coefficients comprising the all-pole model of the frequency spectrum of the block of data stored in sample store 10. Specifically, the coefficient generator 22 performs an 11th order LPC (linear prediction coefficient) analysis to model the 224 signal samples.

Frequency response magnitude (FRM) generator 24 computes the FRM of the filter coefficients computed by coefficient generator 22 at the seven DTMF frequencies being used. These FRMs are designated in the drawing as LFG and HFG corresponding to low and high DTMF frequency groups. The FRMs (c) and (d) at 1075 Hz and 500 Hz respectively are computed also. All FRMs are derived utilizing standard transformations such as described at page 19 in the text "Digital Signal Processing" by Alan V. Oppenheim et al, Prentice-Hall, Inc., 1975.

The four signals representing the low frequency group LFG are applied to minimum magnitude selector 26 which produces three output signals—(a0) representing the FRM of that frequency of the low group for which the FRM is smallest; the next smallest (a1); and an index signal $I_L$ identifying the particular low group signal with the smallest value. This index signal varies from 0 to 3 corresponding to the lowest through highest frequency tones of the low group.

The index signal $I_L$ is applied to a second FRM generator 28, together with the LPC filter coefficients output from LPC coefficient signal generator 22. FRM generator 28 computes the FRM for the filter coefficients at frequencies corresponding to +3.5% (a+Δ), −3.5% (a−Δ), +1.5% (a+δ) and −1.5% (a−δ) of the frequency of the DTMF tone indicated by minimum magnitude selector 26. The (a+Δ), (a−Δ), (a+δ) and (a−δ) FRM signals are applied to second and third minimum magnitude selectors 30 and 32, respectively.

Figure 3:
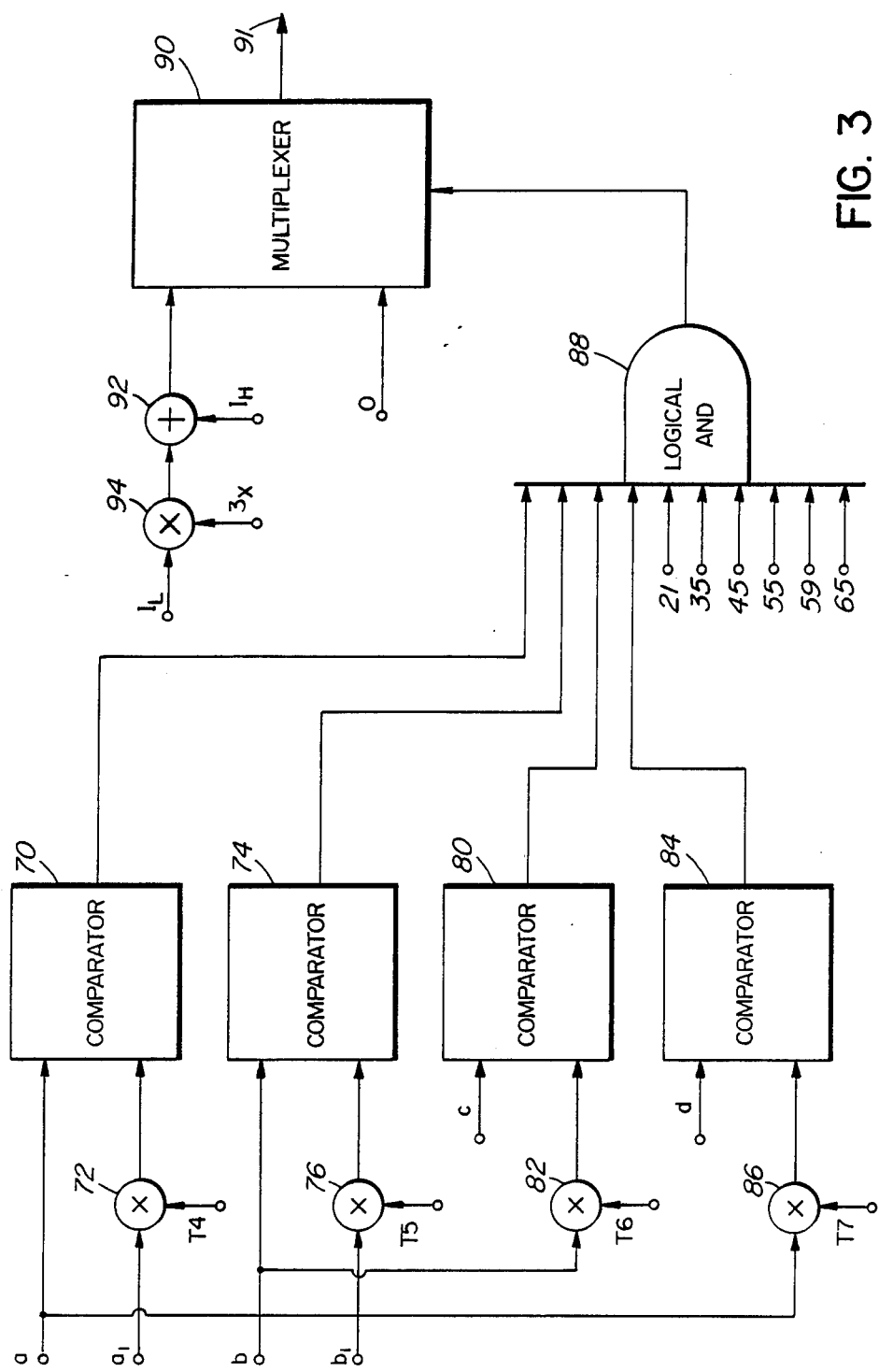
FIG. 3 is a block schematic diagram of yet further parts of the DTMF receiver.

Minimum magnitude selector 32 compares the FRMs a0, a+δ, and a−δ and emits signal (a) representing the smallest input applied thereto, which signal (a) is applied to comparator 34. The output of minimum magnitude selector 30, comprising the lesser of the (a+Δ) and (a−Δ) FRMs, is also applied to comparator 34. The output 35 of comparator 34 is high (signalling DTMF) if the output (a) from minimum magnitude selector 32 is less than the output of minimum magnitude selector 30; and low otherwise. The output 35 of comparator 34 is applied to another input of the AND gate 88 (FIG. 3).

The three signals from the high frequency group HFG are processed in a similar way; the mimimum magnitude selectors numbered 36, 40 and 42 corresponding to minimum magnitude selectors 26, 30 and 32, with the FRM generator and comparator being numbered 38 and 44, respectively. The corresponding signals are identified as $I_H$, b0, b1 and b. The index signal $I_H$ varies from 1 to 3 corresponding to the three frequency tones of the high group. The output 45 of comparator 44 is also applied to the AND gate 88 (FIG. 3).

Figure 2:
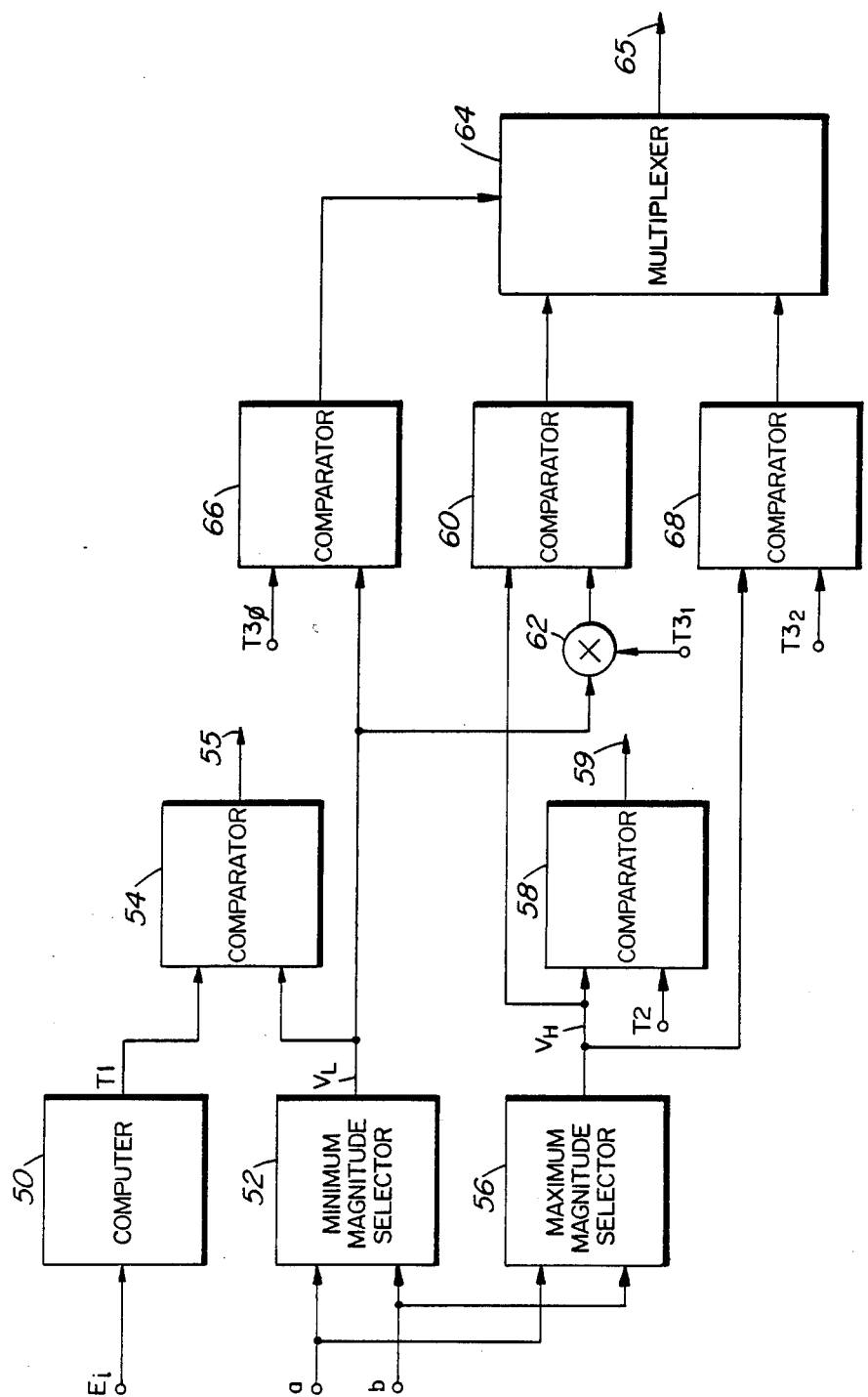
FIG. 2 is a block schematic diagram of further parts of such DTMF receiver.

Referring now to FIG. 2, an instant signal $E_i$ from the energy estimator 14 is applied to a computer 50 which computes a threshold value T1 in accordance with the formula given earlier.

The signals (a) and (b), from the minimum magnitude selectors 32 and 42 are applied to a minimum magnitude selector 52, the output $V_L$ of which is applied, with threshold T1, to comparator 54. This comparator 54 produces a low output level at 55 if the signal $V_L$ exceeds threshold T1.

Also, a maximum magnitude selector 56, which receives the signals (a) and (b) and provides its output, $V_H$, to a further comparator 58. This comparator 58 compares the signal $V_H$ with a constant threshold signal T2. If the threshold signal T2 is smaller than the signal $V_H$, comparator 58 puts out a low level signal at 59. Otherwise the output of comparator 58 is high.

Signal $V_H$ is applied to one input of a comparator 60, to the other input of which is applied the output of a multiplier 62 which derives the product of the signal $V_L$ and a threshold $T3_1$. The output of comparator 60, which is low if signal $V_H$ is lower than such product, is applied to a multiplexer 64 together with the outputs of comparators 66 and 68, respectively. Comparator 66 produces a high output if the signal $V_L$ is less than that of a preselected constant $T3_0$, and comparator 68 produces a low output if the signal $V_H$ is greater than a threshold $T3_2$.

Multiplexer 64 produces an output at 65 equal to one or other of the outputs of comparators 60 and 68, depending upon the output of comparator 66. If the output of comparator 66 is low, the multiplexer output is equal to the output of comparator 60. Otherwise, it produces an output equal to that of comparator 68.

Referring now to FIG. 3, a comparator 70 produces a low output if signal a, applied to one of its inputs from minimum magnitude selector 32 (FIG. 1), is larger than the product of signal a1, from minimum magnitude selector 26 (FIG. 1) and a threshold T4. This product is derived by a multiplier 72 and applied to the second input of the comparator 70.

A comparator 74 and multiplier 76 operate in a similar manner upon signals b and b1 and threshold T5. Comparator 74 gives a low level output if signal b is greater than signal b1 multiplied by threshold T5.

A comparator 80 and multiplier 82 serve to give a low output level if the signal c (the FRM of the filter coefficients computed by FRM magnitude generator 24 (FIG. 1) at the frequency 1975 Hz) is smaller than the signal b multiplied by a threshold T6. Otherwise comparator 80 gives a high output value.

Comparator 84 and multiplier 86 are similarly configured so that comparator 84 will produce a low level output if its input, signal d (the FRM of the filter coefficients computed at the frequency 500 Hz (FIG. 1), is smaller than the output signal a mulitplied by a threshold value T7. Otherwise comparator 84 produces a high output level.

A LOGICAL AND gate 88 produces a high level output indicating the presence of a DTMF signal if, and only if, all input values from the comparators 20, 34, 44, 54, 58, 70, 74, 80, 84 and the multiplexer 64 correspond to the high level. Otherwise it produces a low level, indicating the absence of a DTMF signal.

This output from LOGICAL AND gate 88 merely indicates that a DTMF signal is present. The particular DTMF signal is identified by reference to the index values $I_L$ and $I_H$ produced by, respectively, minimum magnitude selector 26 and minimum magnitude selector 36 (FIG. 1).

The output of AND gate 88 is applied to a multiplexer 90 which, depending upon the level of the output of AND gate 88, produces an output corresponding to one or other of its two inputs. One of these inputs is set to the constant level of zero and is selected if the output of AND gate 88 is low (no DTMF signal). The other input is connected to an adder 92 to one input of which is applied the index signal $I_H$. The other input is connected to a multiplier 94 which multiplies the index signal $I_L$ by 3. Hence, if the output of AND gate 88 is high, indicating the presence of a DTMF signal, the output of multiplexer 90 is set to a level $3I_L + I_H$.

The multiplexer 90 produces the ultimate output at 91 of the DTMF detector. An output of zero indicates the absence of a DTMF signal. On the other hand, output levels 1 through 12 indicate, respectively, the presence of DTMF digits 1 through 9, asterisk, 0 and Octothorp.

Figure 4:
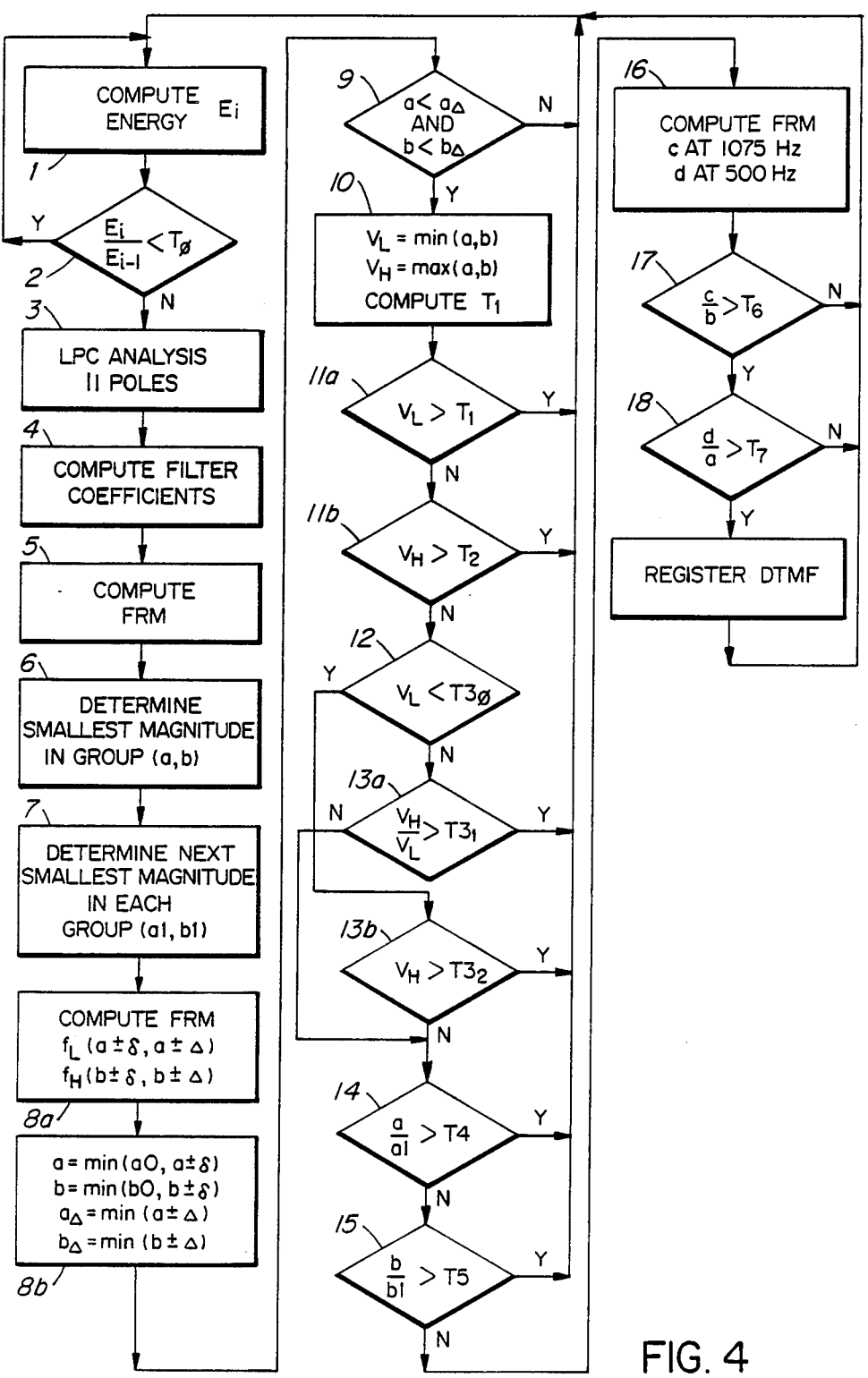
FIG. 4 is a flow chart illustrating the sequence of operations in an LPC-based DTMF receiver embodying the invention.

The sequence of operations of such an LPC-based DTMF receiver will be described with reference to the flow chart shown in FIG. 4.

The sequence of operations (in which the numbered steps correspond to those in the flow chart) is as follows:

(1) Compute the energy $E_i$ of the current frame of data.

(2) If the ratio of the current frame's energy to that of the previous frame is less than a threshold T0, the signal is not DTMF. T0 is dependent upon the frame length.

(3) Perform 11th order LPC analysis based on 224-sample signal segments. This procedure results in an all-pole model of the signal spectrum described by 11 LPC filter coefficients.

(4) Compute the LPC analysis (inverse) filter coefficients.

(5) Compute the magnitudes of the frequency response of the LPC analysis (inverse) filter at DTMF frequencies.

(6) For each group, determine the frequency at which the FRM is smallest. These shall be referred to as $f_L$ (low group) and $f_H$ (high group) with FRMs referred to as a0 and b0, respectively.

(7) For each frequency group, determine the next smallest FRMs. These will be referred to as a1 and b1 for low and high groups, respectively.

(8a,8b) Compute FRMs a±δof $f_L$ and b±δof $f_H$ at ±1.5%, respectively. If the FRMs at ±1.5% are smaller than a0 or b0, update the output to give an a and/or b respectively. Compute FRMs a±Δof $f_L$ and b±Δof $f_H$ at ±3.5% respectively.

(9) If either of the FRMs at ±3.5% of $f_L$ and $f_H$ are smaller than a or b, the signal is not DTMF (Frequency deviation test).

(10) Compute T1 which is dependent upon the signal energy $E_i$.

(11a,11b) If the smaller of a and b (called $V_L$) is greater than the threshold T1, the signal is not DTMF. If the larger of a and b (called $V_H$) is greater than a threshold T2, the signal is not DTMF.

(12,13a) If $V_L$ is not less than $T3_0$, and the ratio $V_H/V_L$ is greater than a threshold $T3_1$, the signal is not DTMF.

(12,13b) If $V_L$ is less than $T3_0$, and $V_H$ is greater than a threshold $T3_2$, the signal is not DTMF.

(14) If the ratio of a to a1 is greater than a threshold T4, the signal is not DTMF.

(15) If the ratio of b to b1 is greater than a threshold T5, the signal is not DTMF.

(16) Compute the FRMs at 500 Hz and 1075 Hz. These values shall be referred to as d and c, respectively.

(17) If the ratio of c to b is smaller than a threshold T6, the signal is not DTMF.

(18) If the ratio of d to a is smaller than a threshold T7, the signal is not DTMF.

An advantage of using LPC-based coding is that it can be done in conjunction with LPC-based speech coding algorithms. This means that little extra work needs to be done to obtain the spectrum model for the DTMF detection algorithm.

It should be noted that long data frames can be modelled. For example, a frame of 224 samples can be modelled adequately with only 11 LPC poles. This reduces complexity, particularly since the FRM has to be computed at far fewer frequencies in checking for the presence of tone pair, leading to smaller computational power requirements.

It is envisaged that improved performance might be obtained by making T2, T4, T5, T6, and threshold T7, respectively, dependent upon the signal energy and the frequencies $f_L$ and $f_H$.

Although, as described, the system detects 7 DTMF frequencies, it can be modified for use with all 8 if so desired.

Advantages of embodiments of the invention are:

more accurate spectrum evaluation at arbitrary frequency points (better frequency resolution);

more precise spectral discrimination between tones and speech spectra; and when operated in secondary signalling mode, economics are achievable due to sharing of signal analysis between DTMF detector and speech encoder.

What is claimed is:

1. A method of detecting the presence of dual tone multifrequency (DTMF) signals from a digital signal, each DTMF signal comprising one of a specified group of low frequencies and one of a group of specified high frequencies, comprising the steps of:

(i) storing (10) frames of the digital signal successively;

(ii) performing (22) a linear prediction coefficient (LPC) analysis upon an instant frame (i) to produce an all-pole model of the spectrum of said digital signal for such instant frame;

(iii) computing (22) LPC analysis filter coefficients corresponding to said all-pole model;

(iv) computing (24) from the filter coefficients for each of said group of low frequencies and said group of high frequencies, a set of Frequency Response Magnitudes (FRMs), each corresponding to one of the DTMF frequencies;

(v) determining (26) which of said set of FRMs corresponding to the group of low frequencies has the smallest magnitude (a0) and identifying the low group frequency ($f_L$) to which such smallest low-group magnitude corresponds;

(vi) determining (36) which of said set of FRMs corresponding to the group of high frequencies has the smallest magnitude (b0) and identifying the high-group frequency ($f_H$) to which such smallest high-group magnitude corresponds;

(vii) computing for said low-group frequency ($f_L$) four frequency-deviated FRMs, a first FRM ($a+\delta$) corresponding to a neighboring higher frequency, a second FRM ($a+\Delta$) corresponding to a more distant higher frequency, a third FRM ($a-\delta$) corresponding to a neighboring lower frequency and a fourth FRM ($a-\delta$) corresponding to a more distant lower frequency;

(viii) computing for said high-group frequency ($f_H$) four frequency-deviated high-group FRMs, a first FRM ($b+\delta$) corresponding to a neighboring higher frequency, a second FRM ($b+\Delta$) corresponding to a more distant higher frequency, a third FRM ($b-\delta$) corresponding to a neighboring lower frequency and a fourth FRM ($b-\Delta$) corresponding to a more distant lower frequency;

(ix) comparing the smallest magnitude FRM (a0) of said set of FRMs corresponding to the low group of frequencies, said first FRM ($a+\delta$) corresponding to the neighboring higher frequency and said third FRM ($a-\delta$) corresponding to said neighboring lower frequency, and determining which is the smaller low-group FRM magnitude (a);

(x) comparing said smaller low-group FRM (a) with said second FRM ($a+\Delta$) and said fourth FRM ($a-\Delta$), corresponding to said more distant higher frequency and said more distant lower frequency, respectively, and, if the magnitude of either said second FRM or said fourth FRM is smaller than said smaller low-group FRM magnitude, indicating that the instant frame of the input signal is not DTMF;

(xi) comparing the smallest frequency response magnitude (b0) of said set of FRMs corresponding to the high group of frequencies with said first ($b+\delta$) and said third ($b-\delta$) high-group FRMs corresponding to neighboring higher and lower frequencies, respectively, and determining which is the smaller high-group FRM (b);

(xii) comparing said smaller high-group FRM (b) with second FRM ($b+\Delta$) and said fourth FRM ($b-\Delta$), corresponding to said more distant higher frequency and said more distant lower frequency, respectively, and, if the magnitude of either said second FRM or said fourth FRM is smaller than said smaller high-group FRM, indicating that the instant frame of the input signal is not DTMF;

(xiii) comparing the magnitude of each of the smaller FRMs from the low-group and high-group against reference thresholds to indicate signals that are not DTMF; and (xiv) registering the presence of a DTMF signal whenever none of the magnitude comparisons indicate that the input signal is not DTMF in the instant frame.

2. A method as defined in claim 1, wherein each said neighboring higher frequency and each said neighboring lower frequency differs by about 1.5% from the corresponding one of said low-group frequency and said high-group frequency.

3. A method as defined in claim 2, wherein each said more-distant lower frequency and each said more-distant higher frequency differs by about 3.5% of the corresponding one of said low-group frequency and said high-group frequency.

4. A method of detecting the presence of dual tone multifrequency (DTMF) signals, comprising one of a specified group of low frequencies and one of a specified group of high frequencies, comprising the steps of:

(i) storing frames of a data signal successively;

(ii) performing a linear prediction coefficient (LPC) analysis upon an instant frame to produce an all-pole model of the spectrum of said data signal for such instant frame;

(iii) computing LPC analysis filter coefficients corresponding to said all-pole model;

(iv) computing for each of said group of low frequencies and said group of high frequencies a set of Frequency Response Magnitudes (FRMs) each corresponding to one of the DTMF frequencies;

(v) determining which of said FRMs in each said group has the smallest magnitude; and (vi) determining which of the two smallest magnitude FRMs from the low-group and high-group, respectively, is the smaller, comparing such smaller FRM with a reference threshold, and indicating the presence of a DTMF signal if the magnitude of such smaller FRM is equal to or less than such reference threshold.

5. A method as defined in claim 4, wherein said reference threshold is dependent upon the energy of the signal during said frame.

6. A method of detecting the presence of dual tone multifrequency (DTMF) signals, comprising one of a specified group of low frequencies and one of a specified group of high frequencies, comprising the steps of:

(i) storing frames of a data signal successively;

(ii) performing a linear prediction coefficient (LPC) analysis upon an instant frame to produce an all-pole model of the spectrum of said data signal for such instant frame;

(iii) computing LPC analysis filter coefficients corresponding to said all-pole model;

(iv) computing for each of said group of low frequencies and said group of high frequencies a set of FRMs each corresponding to one of the DTMF frequencies;

(v) determining which of said FRMs in each said group has the smallest magnitude; and (vi) determining which of the two smallest magnitude FRMs from the low-group and high-group, respectively, is the smaller, comparing such smaller FRM with a reference threshold, and indicating the presence of a DTMF signal if the magnitude of such smaller FRM is equal to or less than such reference threshold.

7. A method as defined in claim 6, wherein said reference threshold is dependent upon the energy of said signal in said frame, and upon said low-group DTMF frequency corresponding to the smallest low-group FRM and upon said high-group DTMF frequency corresponding to the smallest high-group FRM.

8. A method as defined in claim 1, further comprising the steps of:
 (i) storing an input data signal in frames;
 (ii) computing the energy ($E_i$) of an instant frame of data;
 (iii) storing the computed energy for the duration of at least one frame;
 (iv) comparing the ratio of the instant frame energy ($E_i$) to the previous frame energy ($E_{i-1}$) with a predetermined value ($T_0$) and, if such ratio ($E_i/E_{i-1}$) is less than such value ($T_0$), indicating that said input signal is not a DTMF signal.

9. A method of detecting the presence of DTMF signals as defined in claim 1 or 8 further comprising the steps of:
 (i) comparing the magnitudes of each of the smallest magnitude FRMs from the low-group and high-group against preselected thresholds and indicating that the signals are not DTMF whenever they are beyond said thresholds; and
 (ii) comparing the magnitudes of said smallest magnitude FRMs from each group against each other, against selected neighboring FRMs and against the FRMs of signals outside the low-group and high-group frequencies, and indicating that the signals are not DTMF whenever the difference in magnitude of the signals being compared is outside a preselected limit.

* * * * *